United States Patent
Suzuki et al.

[11] Patent Number: 5,673,251
[45] Date of Patent: Sep. 30, 1997

[54] TWO SUBSTRATES BONDING TYPE OPTICAL DISK AND METHOD OF PRODUCING THE SAME

[75] Inventors: Kenji Suzuki; Takahiro Kobayashi; Naoto Kozasa; Jiro Fujimori, all of Yamanashi-ken, Japan

[73] Assignees: Pioneer Electronic Corporation, Tokyo-to; Pioneer Video Corporation, Yamanashi-ken, both of Japan

[21] Appl. No.: 566,017

[22] Filed: Dec. 1, 1995

[30] Foreign Application Priority Data

Jan. 31, 1995 [JP] Japan ................. 7-014658

[51] Int. Cl.$^6$ ............................................. G11B 7/24
[52] U.S. Cl. .............................. 369/275.4; 369/275.1; 428/694 SC; 428/694 ML
[58] Field of Search ............... 369/275.4, 275.3, 369/13, 288, 275.1, 283; 428/694 ML, 694 MM, 694 SC

[56] References Cited

U.S. PATENT DOCUMENTS

| | | | |
|---|---|---|---|
| 4,450,553 | 5/1984 | Holster | 369/275.1 |
| 4,503,531 | 3/1985 | Kato | 369/275.1 |
| 4,984,231 | 1/1991 | Yasuoka et al. | 369/275.1 |
| 5,077,120 | 12/1991 | Kato et al. | 369/275.1 X |
| 5,479,382 | 12/1995 | Nishida et al. | 369/13 |

*Primary Examiner*—Ali Neyzari
*Attorney, Agent, or Firm*—Kane, Dalsimer, Sullivan, Kurucz, Levy, Eisele and Richard, LLP

[57] ABSTRACT

This optical disk is two-substrates bonding type. In the optical disk, from the first transparent substrate side toward the second substrate side, at least following layers are laminated in that order; (1) the first transparent substrate, (2) the first optical film, (3) the intermediate layer, (4) the second optical film, and (5) the second substrate. The intermediate layer is formed of a dry photohardenable film of light transmissive type, which has a viscosity of 3,500 to 400,000 poises at a room temperature and in a non-hardened condition and has a thickness of 5 to 200 μm in the non-hardened condition. The shapes of pits or grooves and the extent of light transmissive property are set so that both of the first pit-groove surface on the first transparent substrate and the second pit-groove surface on the second substrate can be read by irradiating the optical disk with the beam for reproduction from the first transparent substrate side of the optical disk. According to this optical disk, it is possible to improve the recording or reproducing density, transmission rate, and reproducing time while no reading obstruction is caused.

28 Claims, 3 Drawing Sheets

BEAM FOR REPRODUCTION

FIG. 1

BEAM FOR REPRODUCTION

TWO SUBSTRATES BONDING TYPE OPTICAL DISK AND METHOD OF PRODUCING THE SAME

BACKGROUND OF THE INVENTION

The present invention generally relates to an optical disk and a method of producing the same, and more particularly to: a two-substrates bonding type optical disk, in which the recorded information can be reproduced from the information signals carried on a plurality of pit-groove layers respectively by irradiating the optical disk with the beam for reproduction from a side of its one surface while reading obstruction is not caused; the optical disk, which can improve the recording density to be higher and the transmission rate of information to be higher without the enlargement of the disk area or the reduction of the pit size; the optical disk, which can be simplify a mechanism of the recording or reproducing device; and a method of producing the same.

In the field of the optical disk, it is always demanded to increase the recording density and the transmission rate. Recently, especially in the field of the DVD (Digital Video Disk), the demand has become strong since it is necessary to record and reproduce the video information of high quality.

As recording and reproducing techniques of the optical disk, there are a technique of: using a single substrate type optical disk, in which pits or grooves are formed on one side of one substrate such as a CD and a CD-ROM; and reading the recorded signals by irradiating it with the laser beam from a side of the mirror surface, a technique of: using an optical disk of such a type formed by bonding two substrates together on each of which pits or grooves are formed such as a LD; reading the recorded signals on the A surface side by irradiating it with the laser beam from the A surface side; and reading the recorded signals on the B surface side by irradiating it with the laser beam from the B surface side, and so forth. In any of those techniques, the method of enlarging the disk area or reducing the pit size has been employed in order to increase the recording density and the transmission rate. However, there is a practical limit in the enlargement of the disk area, and there is a technical limit in the reduction of the pit size, so that there is a certain limit in the increase of the recording density and the transmission rate.

There is the other attempt to increase the recording density and the transmission rate by: using an optical disk of such a type formed by bonding two substrates, on each of which pits or grooves are formed, through an intermediate layer of light transmissive type; and simultaneously reading the recorded signals which are carried on a plurality of layers respectively by irradiating it with the laser beam for reproduction from one surface side of the disk. In the case where such two-substrates bonding type optical disk is produced, the adhesive such as the epoxy type adhesive, the solvent type adhesive, the hot melt type adhesive (Publication Of Japanese Patent Application (kou-koku) No. Hei-2-48984 on 26 Oct. 1990), 2P adhesive, and so forth, is coated with on the substrate by means of a roll coater and so forth, to bond the two substrates together and to form the intermediate layer of the adhesive.

However, the intermediate layer formed in such manner is optically non-uniform, because those adhesives tend to hold the bubbles inside, and because the intermediate layer formed by means of the roll coater and so forth has considerable unevenness in the thickness. Therefore, in this attempt, the recorded signals, which is carried by the layer located beyond the intermediate layer from the view point of the emission side of the laser beam for reproduction, cannot be successfully read and the actual state is that there is not enough performance yet.

Accordingly, the present invention has been accomplished in consideration of the aforementioned circumstances, and it is a first object of this invention to provide an optical disk, which can increase the recording density and the transmission rate of the information without the enlargement of disk area or the reduction of pit size, and besides, in which the recorded information can be reproduced from its record surface while the reading obstruction is not caused.

Another object of the present invention is to provide a method of producing the aforementioned optical disk efficiently.

SUMMARY OF THE INVENTION

In order to achieve the aforementioned objects, the optical disk of the present invention is constructed to comprise:

a first partial structure which comprises a first transparent substrate having a first pit-groove surface provided with first pits or grooves carrying first information signals, and a first optical film formed on the first pit-groove surface;

a second partial structure which comprises a second substrate having a second pit-groove surface provided with second pits or grooves carrying second information signals, and a second optical film formed on the second pit-groove surface; and an intermediate layer interposed between the first and the second partial structures, with the first optical film side of the first partial structure and the second optical film side of the second partial structure disposed opposite to each other, wherein, the first optical film partially transmits an incident light beam, each of the second pits or grooves has a shape capable of having the second information signal read by irradiating the optical disk with the incident light beam from a first transparent substrate side of the optical disk, and the intermediate layer is formed of a dry photohardenable film of light transmissive type, which has a viscosity of 3,500 to 400,000 poises at a room temperature and in a non-hardened condition and has a thickness of 5 to 200 μm in the non-hardened condition.

In this optical disk, the first partial structure and the second partial structure are laminated each other by the medium of the light transmissive intermediate layer; and a shape of each second pits or grooves is capable of being read by irradiating the optical disk with the light beams from the first transparent substrate side of the optical disk as well as the shapes of the first pits or grooves.

According to the construction of the optical disk of the present invention, a part of the incident light beam irradiating the optical disk from the first transparent substrate side transmits the first optical film and the intermediate layer, and reaches the second pits or grooves which carry the second information signals. Therefore, it becomes possible to simultaneously or continuously reproduce the first information signals which are carried by the first pits or grooves, and the second information signals which are carried by the second pits or grooves on a different layer from where the first pits or grooves are formed on, by irradiating this optical disk with a single or a plurality of reproduction beams from the first transparent substrate side, and by DC-offsetting the focus positions of those reproduction beams. Thus, not only the high recording and reproducing density become possible, but also the high transmission rate can be promoted if a plurality of pickups are used. Furthermore, in a case where the second information signals on the second pit-groove surface are continuously reproduced after the reproduction of the first information signals on the first pit-groove surface is over, or in a case where the reproduction of the second pit-groove surface and the first pit-groove surface is continuously performed in that order, there is no necessity to turn over the optical disk by the hands or mechanical operation in the reproducing device, or to move the pickup to a opposite side of the optical disk by the mechanical operation in the reproducing device, because it is sufficient for the reproduction as long as the reproduction beams irradiate the optical disk from only one side of the optical disk.

And that, since the intermediate layer is formed of the dry photohardenable film of light transmissive type, which has the viscosity of 3,500 to 400,000 poises at the room temperature and in the non-hardened condition and has the thickness of 5 to 200 μm in the non-hardened condition, the unevenness in the thickness of the intermediate layer and the remaining of the bubbles in the intermediate layer are hardly caused, so that the intermediate layer has high optical uniformity.

That is to say, since the intermediate layer in the optical disk of the present invention is formed by using the material for the intermediate layer which has a shape of a film or a sheet already and by laminating said material between the first and the second partial structures, it has little of the unevenness in the thickness as compared with another intermediate layer formed by coating of the material for the intermediate layer. Furthermore, since the viscosity of the material for the intermediate layer is set at 3,500 to 400,000 poises at the room temperature and in the non-hardened condition, the intermediate layer having the shape of a film is prevented from deforming during a process in which the dry photohardenable film as the formation material is laminated between the first and the second optical films and is hardened by the ultra-violet light, so that the unevenness in the thickness is reduced. And besides, the remaining of the bubbles in the film for the intermediate layer is also reduced because of the above-mentioned viscosity of 3,500 to 400,000 poises. Furthermore, since the thickness of the film which comprises the material for the intermediate layer is set at 5 to 200 μm in the non-hardened condition, the bubbles are discharged easily from the inside of the film to hardly remain.

And then, since the dry photohardenable film as the intermediate layer has high optical uniformity as mentioned above, the reading obstruction is not caused when the reproduction beam which is emitted on the optical disk from the first transparent substrate side of the optical disk transmits through the dry photohardenable film, and the second pits or grooves carrying the second information signals can be also precisely reproduced.

Furthermore, if the record film as the optical film is laminated in place of the reflection film on either one or both of the first and the second pit-groove surfaces, it is possible to make the optical disk writable.

On the other hand, the method which can produce the aforementioned optical disk of the present invention efficiently is constructed to comprise:

a step of preparing a first partial structure by forming a first optical film, which partially transmits an incident light beam, on a first pit-groove surface of a first transparent substrate in which the first pit-groove surface is provided with first pits or grooves carrying first information signals;

a step of preparing a second partial structure by forming a second optical film on a second pit-groove surface of a second substrate, in which the second pit-groove surface is provided with second pits or grooves carrying second information signals and in which each of said second pits or grooves is formed into a shape capable of being read by irradiating the second substrate with the light beam from a second pit-groove surface side of the second substrate;

a step of bonding the first and the second partial structures together by laminating a dry photohardenable film of light transmissive type, which has a viscosity of 3,500 to 400,000 poises at a room temperature and in a non-hardened condition and has a thickness of 5 to 200 μm in the non-hardened condition, between the first and the second partial structures with the first optical film side of the first partial structure and the second optical film side of the second partial structure disposed opposite to each other to form a layered product, and by pressing the layered product; and a step of hardening the dry photohardenable film in the layered product by irradiating the layered product with ultra-violet light from a first transparent substrate side of the layered product, while pressing the layered product.

According to this method of the present invention, the intermediate layer is formed by using the dry photohardenable film in the non-hardened condition as the formation material, by laminating the dry photohardenable film between the first and the second optical films, by pressing thus obtained layered product, and by irradiating the layered product with the ultra-violet light under the pressure to harden the dry photohardenable film in the layered product.

In this method, since the material for the intermediate layer which has been made a shape of a film or a sheet previously is used for the laminating, the unevenness in the thickness of the intermediate layer is reduced as compared with a case of the coating of the above material. Furthermore, the viscosity of the material is set at 3,500 to 400,000 poises at a room temperature and in a non-hardened condition. In this range of the viscosity, first, the unevenness in the thickness of the dry photohardenable film is little since the dry photohardenable film is hard to deform when it is interposed between the first and the second Optical films and is subsequently hardened by the ultra-violet light, second, the bubbles are hard to remain in the dry photohardenable film, third, an adhesion to bond the surfaces of the first and the second optical films together is secured sufficiently, and fourth, the stress due to the shrinkage by hardening at the time of the ultra-violet light irradiation does not become too much. Furthermore, the thickness of the dry photohardenable film is set at 5 to 200 μm in the non-hardened condition. In this range of the thickness, first, the bubbles are hard to remain in the dry photohardenable film since the discharge of the bubbles is easy, second, the handling and the treatment of the dry photohardenable film is easy during manufacturing said film and the optical disk since the wrinkles are hardly generated when said film is preserved, and third, the stress due to the shrinkage by hardening at the time of the ultra-violet light irradiation does not become too much.

Furthermore, because the first optical film is semitransparent, in the step of hardening by the ultra-violet light, there is possible to harden the dry photohardenable film as the intermediate layer by irradiating said film with the ultra-violet light from the first transparent substrate side of the optical disk.

DESCRIPTION OF THE PREFERRED EMBODIMENTS

Referring to the drawings, the embodiments of the present invention will be explained.

Figure 1:
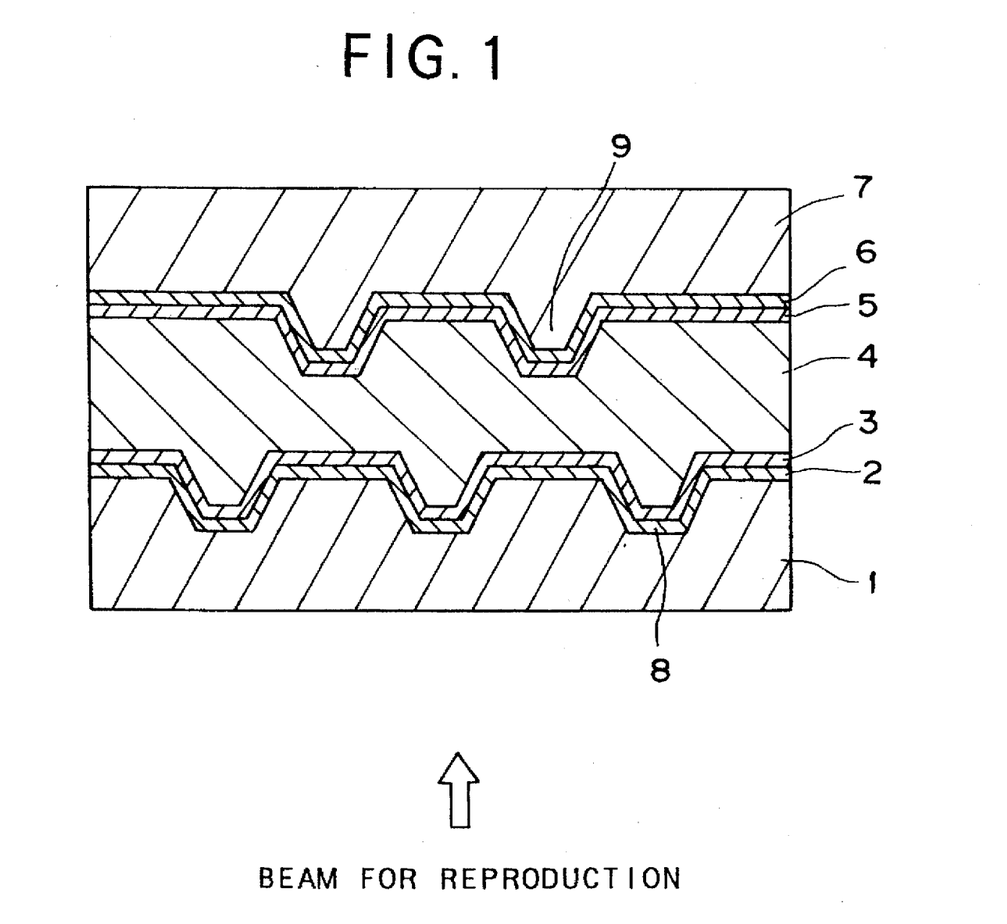
FIG. 1 is a schematically cross-sectional view showing one embodiment of the optical disk of the present invention.

FIG. 1 shows a lamination construction in one embodiment of the optical disk of the present invention. This optical disk has a construction in which, from the first transparent substrate 1 side toward the second substrate 7 side, a plurality of layers are laminated in order of the first transparent substrate 1, the first optical film 2, a first protection film 3, the intermediate layer 4, the second protection film 5, the second optical film 6, and the second substrate 7. Then, first pits 8 carrying the first information signals are formed on one surface of the first transparent substrate 1 where the first optical film 2 is laminated, and the second pits 9 carrying the second information signals are formed on one surface of the second substrate 7 where the second optical film 6 is laminated. Both of the pits 8 and pits 9 have shapes capable of being read by the beam for reproduction irradiating the optical disk from the first transparent substrate side of the optical disk. In FIG. 1, the pits are formed on the transparent substrates. In the present invention, however, the grooves may be formed on at least one of the first and the second substrates in place of the pits.

As the formation material for the first transparent substrates 1, a material having a light transmissive capability will do. For example, transparent materials such as resin e.g. polycarbonate (PC) and polymethyl methacrylate (PMMA), and optical glass may be listed. Among those transparent materials, the polycarbonate (PC) is preferably used since it is excellent in the resistance to environment and is also excellent in the dimension stability.

When the formation material is the resin, the transparent substrate 1 may be integrally formed and the pits are simultaneously formed on its surface, by means of insert injection molding in which the die having the stamper put in its cavity is used.

On the other hand, the second substrate does not always require light transmissive capability. However, in a case of making the second substrate, it may be formed in the same manner as the first transparent substrate.

The shape and the size of the transparent substrate are appropriately determined in accordance with the usage of the optical disk. For example, in a case of the digital video disk (DVD) whose specification is being developed at present, each of the transparent substrate 1 and 7 is a disklike shape which has a diameter of about 120 mm and a thickness of about 0.6 mm, and is provided with a center hole having a diameter of about 15 mm at the central portion thereof.

The depth of the first pits 8 and the second pits 9 on the first or the second substrate are normally 0.02 to 1 μm, and preferably 0.05 to 0.3 μm. If the depth is less than 0.02 μm, there may happen a case where it cannot be correctly performed to read out the information. On the other hand, If the depth is more than 1 μm, the effect corresponding to it cannot be realized.

In the present invention, it is necessary that the beam for reproduction irradiating the optical disk from the first transparent substrate 1 side reaches the second pits 9 at the time of the reproduction. And, it is also necessary at the time of manufacturing of the optical disk that the ultra-violet light reaches and hardens the material for the intermediate layer, which is interposed between the first optical film 2 and the second optical film 6 and is in the non-hardened state. Accordingly, it is necessary for the first optical film 2 laminated on the first transparent substrate 1 to partially transmit the incident light beam, and is preferable for it to reflect about 30% of the incident light while passing about 60 % of the incident light.

As the first and the second optical films, for example, it is possible to use the reflection film, the record film, and so forth. As the first reflection film for the first optical film 2 having semitransparency, for example, a metallic film which is thinner than that one normally utilized is listed, and more concretely, the metallic film having thickness of about 100 to 200 Angstrom and comprising silver (Ag), nickel (Ni), aluminum (Al), and so forth is listed. As the formation method of the first reflection film 2, for example, the sputtering method, the vacuum vapor deposition method, and the ion plating method is listed.

As the first optical film 2, the first record film having semitransparency may be laminated on the first transparent substrate in place of the first reflection film. In this case, the optical disk can be constructed as a disk of writable type. The material for the first record film 2 having semitransparency is not particularly limited, but as said material, the known recording materials belonging to the magneto optical recording type, the phase changing type, the pigment film type, the metallic film type etc., are listed, and more concretely, the dielectric material such as zinc selenide, bismuth oxide, cadmium sulfide, and cadmium telluride is listed. And so, the first record film 2 can be formed by means of the known method.

On the other hand, it is unnecessary for the second optical film 6, such as the second reflection film and the second record film, laminated on the second substrate 7 to be semitransparent unlike the first optical film 2. As a formation material for the second reflection film 6 for example, aluminum (Al), aluminum alloy (Al alloy), gold (Au), silver (Ag), and copper (Cu) are listed. Among those, Al and Al alloy are preferred. As the formation method of the second reflection film 6, for example, the sputtering method, the vacuum vapor deposition method, and the ion-plating method are listed. The thickness of the second reflection film 6 is normally 0.05 to 0.2 μm, and preferably 0.08 to 0.12 μm.

Here, it is possible to construct the optical disk as a disk of writable type by laminating the second record film as the second optical film 6 in place of the second reflection film. The material for the second record film 6 is not particularly limited, but as said material, the known recording materials belonging to the magneto optical recording type, the phase changing type, the pigment film type, the metallic film type etc., can be used. And so, the second record film 6 can be formed by means of the known method.

The first protection film 3 may be laminated on the first optical film 2 so as to protect an exposed surface of the first optical film 2 in the state where the intermediate layer has not been laminated thereon yet, and also, the second protection film 5 may be laminated on the second optical film 6 for the same purpose. These first and second protection films 3 and 5 are useful for a semi-processed articles such as the aforementioned first and second partial structures to be transported and preserved while exposing their optical films. However, one of the first protection film 3 and the second protection film 5 or both may be omitted.

The first protection film 3 and the second protection film 5 must transmit at least a part of the incident light beam by the same reason in the case of the first optical film 2. As for the first optical film 2, it needs semitransparent property capable of reflecting or absorbing a part of the beam for the reproduction so as to reproduce the first information signals carried on the first pits 8. To the contrary, The first and the second protection films 3 and 5 prefer the transparent property having substantially 100% of the light transmittance, since it is preferable that the beam for reproduction and the ultra-violet light for hardening is not influenced when they pass through the optical disk.

The first protection film 3 is laminated on the first optical film 2 through or not through an adhesive layer, and also, the second protection film 5 is laminated on the second optical film 6 through or not through an adhesive layer. As the formation material for each of the protection film 3 and 5, for example, epoxy resin, acrylic resin, silicone resin, urethane resin, and ethylene/vinyl acetate copolymer are listed. Each of the protection film 3 and 5 may be a ultra-violet light hardenable resin coated by means of the so called 2P (Photo Polymerization) method. Each of the thickness of the protection film 3 and 5 is normally 2 to 200 µm, and preferably 5 to 20 µm.

The intermediate layer 4 is formed of the dry photohardenable film of light transmissive type, and is formed by laminating the formation material which has a shape of the film or the sheet in the non-hardened condition between the first protection film 3 and the second protection film 5, and by subsequently hardening with the ultra-violet light. The dry photohardenable film being at a room temperature and in a non-hardened condition has the viscosity of 3,500 to 400,000 poises, preferably 20,000 to 40,000 poises, and has the property to be hardened by the ultra-violet light irradiation, and does not substantially contain solvent.

If the viscosity of the dry photohardenable film at the room temperature and in the non-hardened condition is lower than 3,500 poises, there may arise some problems, for example, that it becomes almost liquid to prevent its film shape from keeping, and that its shrinkage by hardening becomes too much after it is laminated on the optical film. On the other hand, If this viscosity is higher than 400,000 poises, the bubbles which are introduced during the production process of the optical disk come to remain easily, and there may be a case where its adhesion to the optical film or the protection film is reduced to deteriorate practical use.

Further more, the thickness of the dry photohardenable film being in the non-hardened condition is set at 5 to 200 µm, preferably 20 to 80 µm, and more preferably about 50 µm. If the thickness of the dry photohardenable film is less than 5 µm, since a distance between the first and the second pit-groove surfaces is too short, the first pits or grooves formed on the first transparent substrate 1 may influence the recording operation and the reproducing operation in which the second pit-groove surface of the second substrate 7 is irradiated with the beam. On the other hand, If the thickness of the dry photohardenable film is more than 200 µm, it is inconvenient for handling of said film because the wrinkles are generated easily in said film during preserving said film in the non-hardened condition, and there may be a case where a stress due to the shrinkage by hardening becomes too much after laminating said film onto the optical film or the protection film.

The dry photohardenable film is formed of a photohardenable type resin compound which changes to a macro molecular polymer by crosslinking and/or polymerization. As such photohardenable type resin compound, for example, a photo-polymerization type photo-sensitive resin compound is listed.

This photo-polymerization type photo-sensitive resin compound comprises ethylene unsaturated monomer, photo-polymerization initiator, and binder-polymer.

Here, as ethylene unsaturated monomer, following examples are listed: t-butyl acrylate; 1,5-pentanediol diacrylate; N,N-diethylaminoethyl acrylate; ethyleneglycol diacrylate; 1,4-butanediol diacrylate; diethyleneglycol diacrylate; 1,3-propanediol diacrylate; decamethyleneglycol diacrylate; decamethyleneglycol dimethacrylate; 1,4-cyclohexenediol dtacrylate; 2,2-dimethylolpropane diacrylate; glycerol diacrylate; tripropyleneglycol diacrylate; glycerol triacrylate; trimethylolpropane triacrylate; pentaerythritol triacrylate; polyoxyethylate trimethylolpropane triacrylate; polyoxyethylate trimethylolpropane trimethacrylate; 2,2-di(p-hydroxyphenyl)propane diacrylate; 2,2-di(p-hydroxyphenyl)propane dimethacrylate; pentaerythritol tetraacrylate; triethyleneglycol discrylate; polyoxyethyl-2,2-di-(p-hydroxyphenyl)propanedimethacrylate; triethyleneglycol dimethacrylate; polyoxypropyltrimethylolpropane triacrylate; ethyleneglycol dimethacrylate; butyleneglycol dimethacrylate; 1,3-propanediol dimethacrylate; 1,2,4-butanetriol trimethacrylate; 2,2,4-trimethyl-1,3-pentanediol dimethacrylate; pentaerythritol tetramethacrylate; trtmethylolpropane trimethacrylate; 1,5-pentanediol dimethacrylate.

Such ethylene unsaturated monomers can be use singly or in combination of two or more kinds. The percentage content of the ethylene unsaturated monomers in the photo-polymerization type photo-sensitive resin compound is normally 5 to 90 weight %, preferably 15 to 50 weight %.

As the photo-polymerization initiator, following examples are listed: 9,10-anthraquinone; 1-chloroanthraquinone; 2-chloroanthraquinone; 2-methylanthraquinone; 2-ethylanthraquinone; 2-tert-butylanthraquinone; octamethylanthraquinone; 1,4-naphthoquinone; 9,10-phenanthrenequinone; 1,2-benzanthraquinone; 2,3-benzanthraquinone; 2-methyl-1,4-naphthoquinone; 2,3-dichloronaphthoquinone; 1,4-dimethylanthraquinone; 2,3-dimethylanthraquinone; 2,3-diphenylanthraquinone; 2-phenylanthraquinone; sodium salt of anthraquinone alpha-sulfonic acid; 3-chloro-2-methylanthraquinone; retenequinone; polynuclear quinones such as 7,8,9,10-tetrahydronaphthacenequinone; benzoin; pivaloin; acyloin ether; alpha-(hydrocarbone substituent) aromatic acyloin; phenazine; oxazine; Michler's ketone; benzophenone; cyclohexadiene compound.

Such photo-polymerization initiators can be use singly or in combination of two or more kinds. It is preferable to use a sensitizer together with those photo-polymerization initiators. The percentage content of the photo-polymerization initiator in the photo-polymerization type photo-sensitive resin compound is normally 0.5 to 30 weight %, preferably 1 to 5 weight %.

As the binder-polymer, following examples are listed: polymethyl methacrylate; polyethyl methacrylate; polyvinyl acetate; polyvinyl acetate/acrylate; polyvinyl acetate/methacrylate; ethylene/vinyl acetate copolymer; polystylene polymers; polystylene copolymers; vinylidene chloride/acrylonitrile; copolymer of vinylidene chloride/methacrylate and vinylidene chloride/vinylidene acetate; polyvinyl chloride and copolymer thereof; butadiene/acrylonitrile; acrylonitrile/butadiene/stylene; methacrylate/acrylonitrile/butadiene/styrene copolymer; 2-chlorobutadiene-1,3-polymer; chlorinated rubber; styrene/ butadiene/styrene; styrene/isoprene/styrene block copolymer; epoxids containing acrylate groups or methacrylate groups; copolyester; polyamide; cellulose ester; cellulose ether; polycarbonate; polyvinyl acetal; polyformaldehyde.

Such binder-polymers can be use singly or in combination of two or more kinds. The percentage content of the binder-polymer in the photo-polymerization type photo-sensitive resin compound is normally 5 to 90 weight %, preferably 15 to 50 weight %.

The photo-polymerization type photo-sensitive resin compound containing those components may further contain other components such as plasticizer, thickener, ultra-violet light absorbent, antioxidant, fluorescent bleaching agent, heat-stabilizer, mold release agent, and so forth as long as the viscosity of the dry photohardenable film at a room temperature and in a non-hardened condition is in the aforementioned range.

As for the percentage content of those additional components in the photo-polymerization type photo-sensitive resin compound, that of the plasticizer is normally 0 to 25 weight %, preferably 5 to 15 weight %, on the other hand, those of the other components are normally 0 to 5 weight %, preferably 1 to 4 weight % respectively.

As the photohardenable compound to form the dry photohardenable film, other than the aforementioned photo-polymerization type photo-sensitive resin compound, for example, the light-dimerization type photo-sensitive resin compound and the light-crosslinking type photo-sensitive resin compound are listed.

As described above, the intermediate layer 4 of the dry photohardenable film is formed by laminating the formation material, which has the film shape and is in the non-hardened state, between the first optical film 2 or the first protection film 3 and the second optical film 6 or the second protection film 5, and by subsequently hardening with the ultra-violet light. And so, bonding of the dry photohardenable film to the optical film or the protection film is performed by utilizing an adhesion of the dry photohardenable film. Accordingly, in this optical disk, it is unnecessary that an adhesive layer is provided on the dry photohardenable film so as to laminate said film.

The refraction index of the dry photohardenable film after the hardening is normally 1.40 to 1.60. It is preferable that the difference in the refraction index between the dry photohardenable film and the first transparent substrate 1, and between said film and the second substrate 7 are 0.05 or less respectively.

Referring to FIG. 1, the first information signals carried on the pits 8 of the first transparent substrate 1 and the second information signals carried on the pits 9 of the second substrate 7 are normally read with a reflected light of the laser beam irradiated from the first transparent substrate 1 side of the optical disk. In such case, the second substrate 7 does not require the light transmissive capability, and may be a colored substrate.

In the aforementioned optical disk of the present invention, the information signals, which are carried on a plurality of the pit-groove surfaces laminated in the optical disk respectively, can be simultaneously or continuously reproduce while causing no reading obstruction, by irradiation of the beam for reproduction from the first transparent substrate side of the optical disk. Therefore, it is possible to improve the recording density per a certain extent of an area on the optical disk, and to extend the reproducing time. It is also possible to promote the high transmission rate, if a plurality of pickups are used. For example, the reproducing time or the data-transmission rate of the optical disk of the present invention may be made one and a half to two times as compared with a case where a optical disk includes only one pit-groove surface having the same format and the same recording density as the former. Furthermore, in a case where the second information signals on the second pit-groove surface are continuously reproduced after the reproduction of the first information signals on the first pit-groove surface is over, or in a case where the reproduction is continuously performed in reverse order to the former, there is no necessity to turn over the optical disk by the hands or mechanical operation in the reproducing device or to move the pickup to the opposite side of the optical disk by the mechanical operation in the reproducing device, because it is sufficient for reproduction as long as the reproduction beams irradiate the optical disk from only one side of the optical disk.

The aforementioned optical disk of the present invention is produced efficiently by means of a method explained above. FIG. 2 is a process diagram showing one embodiment of the method of the present invention.

Figure 2A:
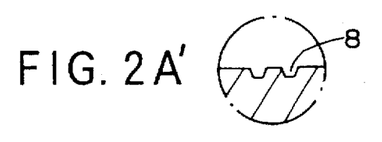
FIGS. 2A–2G is a process diagram showing one embodiment of the method of the present invention.

Firstly, in this method, as shown in FIG. 2A, the first transparent substrate 1 of which the pits 8 carrying the first information signals are formed on one surface is prepared. Instead of the pits 8, the grooves carrying the first information signals may be formed on the first transparent substrate 1. Each of the pits 8 carrying the first information signals has a concave shape so that the first information signals can be read with the beam for reproduction which irradiates the pits 8 from an opposite side to the pit-groove surface of the first transparent substrate 1.

The first transparent substrate 1 can be obtained by using a die having a stamper put in its cavity, and by molding the transparent resin such as polycarbonate (PC) and so forth by means of insert injection molding.

One embodiment of the insert injection molding is shown in FIG. 3. In this embodiment, first, as shown in FIG. 3A, the laser light is irradiated onto a glass disk 202, which is coated with a photo-resist material 201, to record information, and this is etching-developed to form a master disk in a concave and convex shape. Second, as shown in FIG. 3B, a nickel stamper 203 which is shown in FIG. 3C is formed by nickel-electrocasting with the above master disk. And third, as shown in FIG. 3D, the above nickel stamper 203 is put into a cavity of a die, and a resin for forming of the transparent substrate is molded by means of the injection molding with said die, thus, the first transparent substrate 1 having the pits 8 is obtained.

Figures 2B, 2D, 2E, 2F:
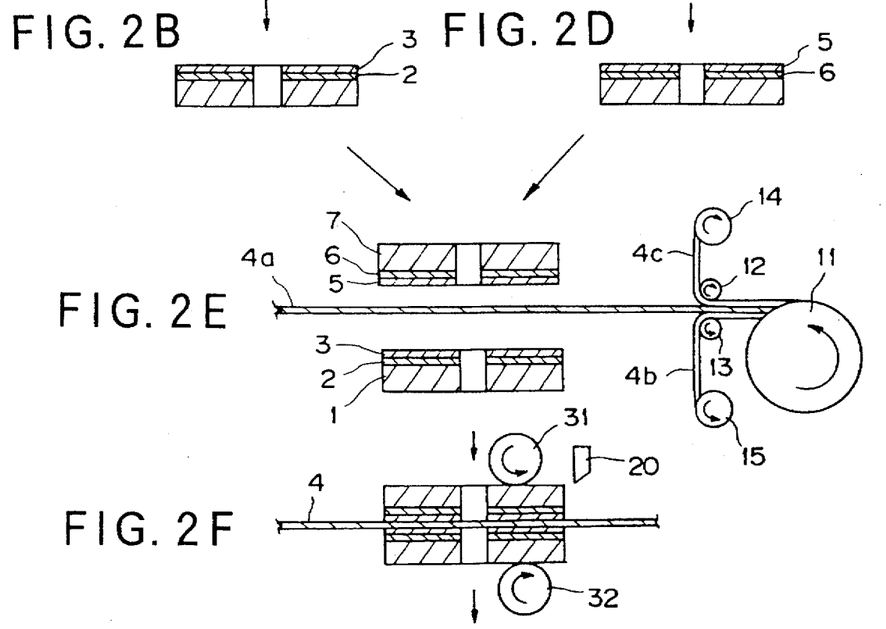

Nextly, as shown in FIG. 2B, the first optical film 2 and the first protection film 3 is formed in this order on the pit-groove surface of the first transparent substrate 1.

It is necessary for the first optical film 2 to partially transmit an incident light beam, and is preferable for it to reflect about 30% of the incident light while passing about 60% of the incident light.

As the first optical film 2, for example, the reflection film and the record film is utilized. As the first reflection film having semitransparency, for example, a metallic film which is thinner than that one normally utilized is listed, and more concretely, the metallic film having thickness of about 100 to 200 Angstrom and comprising silver (Ag), nickel (Ni), aluminum (Al), and so forth is listed. As the formation method of the first reflection film 2, for example, the sputtering method, the vacuum vapor deposition method, and the ion plating method is listed.

Instead of the above first reflection film, the first record film having semitransparency may be also laminated on the first transparent substrate. In this case, the optical disk can be constructed as a disk of writable type. The material for the first record film 2 having semitransparency is not particularly limited, but as said material, the known recording materials belonging to the magneto optical recording type, the phase changing type, the pigment film type, the metallic film type etc., are listed, and more concretely, the dielectric material such as zinc selenide, bismuth oxide, cadmium sulfide, and cadmium telluride is listed. And so, the first record film 2 can be formed by means of the known method.

It is necessary for the first protection film 3 to transmit at least a part of the incident light beam, and is preferable for it to have substantially 100% of light transmittance. The first protection film 3 is laminated on the first optical film 2 through or not through an adhesive layer. As the formation material for the protection film 3, for example, epoxy resin, acrylic resin, silicone resin, urethane resin, and ethylene/vinyl acetate copolymer are listed. The protection film 3 may be also a ultra-violet light hardenable resin coated by means of the so called 2P (Photo Polymerization) method. The thickness of the protection film 3 is normally 2 to 200 μm, and preferably 5 to 20 μm.

This first protection film 3 is a layer to protect an exposed surface of the first optical film 2 in the state where the intermediate layer has not been laminated thereon yet. Thus, it is useful for a semi-processed articles such as the aforementioned first and second partial structures, if said articles are transported or preserved while exposing their optical films. However, the first protection film 3 may be omitted.

By going through the steps of FIG. 2A and FIG. 2B, the first partial structure, which is constructed by laminating the first optical film 2 and the first protection film 3 on the first transparent substrate 1, is obtained. On the other hand, By going through the steps of FIG. 2C and FIG. 2D which parallel the steps of FIG. 2A and FIG. 2B, the second partial structure, which is constructed by laminating the second optical film 6 and the second protection film 5 on the second substrate 7, is obtained.

Figure 2C:
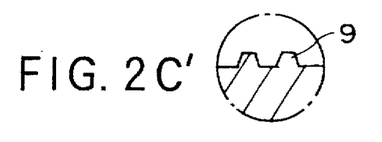

Referring to FIGS. 2C and 2D, as shown in FIG. 2C, the second substrate 7 of which the pits 9 carrying the second information signals are formed on one surface is prepared. Instead of the pits 9, the grooves carrying the second information signals may be formed on the second substrate 7. Each of the pits 9 carrying the second information signals has a convex shape so that the second information signals can be read with the beam for reproduction which irradiates the pits 9 from the pit-groove surface side of the second substrate 7.

The second substrate 7 can be obtained by using the die having the stamper put in its cavity, and by molding the transparent resin such as polycarbonate (PC) and so forth by means of insert injection molding as well as the first transparent substrate 1. However, the second substrate does not always require the light transmissive capability as mentioned above.

And then, as shown in FIG. 2D, the second optical film 6 and the second protection film 5 is formed in this order on the pit-groove surface of the second substrate 7. It is unnecessary for the second optical film 6 to have semitransparent property unlike the first optical film 2. As the second optical film 6, for example, the reflection film and the record film can be utilized.

As a formation material for the second reflection film 6, for example, aluminum (Al), aluminum alloy (Al alloy), gold (Au), silver (Ag), and copper (Cu) are listed. Among those, Al and Al alloy are preferred. As the formation method of the second reflection film 6, for example, the sputtering method, the vacuum vapor deposition method, and the ion-plating method are listed. The thickness of the second reflection film 6 is normally 0.05 to 0.2 μm, and preferably 0.08 to 0.12 μm.

Here, it is possible to construct the optical disk as a disk of writable type by laminating the second record film as the second optical film 6 in place of the second reflection film. The material for the second record film 6 is not particularly limited, but as said material, the known recording materials belonging to the magneto optical recording type, the phase changing type, the pigment film type, the metallic film type etc., can be used. And so, the second record film 6 can be formed by means of the known method.

It is necessary for the second protection film 5 to transmit at least a part of the incident light beam, and is preferable for it to have substantially 100% of light transmittance as well as the first protection film 3. This second protection film 5 may be formed in the same manner as a case of the first protection film 3, and be omitted as well as the first protection film 3.

As shown in FIG. 2E, the first partial structure from the steps of FIGS. 2A–2B and the second partial structure from the steps of FIGS. 2C–2E are aligned while the first protection film 3 and the second protection film 5 is disposed opposite to each other, and then, the dry photohardenable film of light transmissive type 4a is disposed between both of the partial structures.

The dry photohardenable film 4a is still in the non-hardened condition in the step 2E, and has the viscosity of 3,500 to 400,000 poises, preferably 20,000 to 40,000 poises at the room temperature and in the non-hardened condition, and has the property to be hardened by the irradiation of ultra-violet light, and does not substantially contain solvent.

If the viscosity of the dry photohardenable film at the room temperature and in the non-hardened condition is lower than 3,500 poises, there may arise some problems, for example, that it becomes almost liquid to prevent its film shape from keeping, and that its shrinkage by hardening becomes too much after it is laminated on the optical film or the protection film. On the other hand, If this viscosity is higher than 400,000 poises, the bubbles which are introduced during the production process of the optical disk come to remain easily, and there may be a case where its adhesion to the optical film or the protection film is reduced to deteriorate the practical use.

Further more, the thickness of the dry photohardenable film in the non-hardened condition is set at 5 to 200 μm, preferably 20 to 80 μm, and more preferably about 50 μm. If the thickness of the dry photohardenable film is less than 5 μm, since a distance between the first and the second pit-groove surfaces is too short, the first pits or grooves formed on the first transparent substrate 1 may influence the recording operation and the reproducing operation in which the second pit-groove surface of the second substrate 7 is irradiated with the beam. On the other hand, If the thickness of the dry photohardenable film is more than 200 μm, it is inconvenient for handling of said film because the wrinkles are generated easily in said film during preserving said film in the non-hardened condition, and there may be a case where a stress due to a shrinkage by hardening becomes too much after laminating said film onto the optical film or the protection film.

As shown in FIG. 2E, the dry photohardenable film 4a may be continuously supplied from a film supplying roller 11. In FIG. 2E, the dry photohardenable film 4a is rolled on the film supplying roller 11 in a configuration of a lamination composed of said film 4a, a base film 4b such as polyethyleneterephthalate (PET) and so forth, and a cover film 4c such as polyethylene (PE) and so forth. This film 4a is drawn out of the film supplying roller 11. Next, both surfaces of the film 4a are exposed by rolling and taking out the base film 4b with a base film rolling roller 15, and by rolling and taking out the cover film 4c with a cover film rolling roller 14. And then, the exposed dry photohardenable film 4a in the non-hardened condition is disposed between the first and the second partial structures, while its one surface is opposite to the surface of the first protection film 3 and the other surface is opposite to the surface of the second protection film 5.

In FIG. 2F, after the alignment of the partial structures and the disposing of the dry photohardenable film, the first partial structure and the second partial structure are bond together by laminating them through the dry photohardenable film 4, and by subsequently pressing.

Though a pressing method is not limited, in FIG. 2F, a roll-pressing method which presses with an over roll 31 and an under roll 32 is adapted. In a case of the roll-pressing method, first, the pressing operation is performed at the room temperature, second, an applied pressure is normally 0.5 to 50 kg/cm$^2$, and preferably 5 to 20 kg/cm$^2$, and third, a transporting speed with the over roll 31 and the under roll 32 is normally 0.05 to 10 meters/minute and preferably 0.1 to 2 meters/minute. When the roll-pressing method is adapted, since the dry photohardenable film 4 bonding two partial structures together is pressed from one end toward the other end thereof while passing through between two pressing rollers 31 and 32, the bubbles which may be mixed into the dry photohardenable film 4 are squeezed and gathered from one end toward the other end of said film 4, thus, the bubbles are degassed from the other end thereof. Therefore, this pressing method can further reduce the bubbles inside of the intermediate layer.

After two partial structures are bonded together in the aforementioned manner, unnecessary portions of the film 4 existing in any portions of the obtained lamination such as a periphery and a center hole thereof are removed by using a cutter 20.

In the steps from FIG. 2E to FIG. 2F, the dry photohardenable film is put and fixed between the two partial structures being in a position where the surfaces of the protection film of the respective partial structures are opposite to each other. However, a bonding procedure is not limited only such procedure having one step. For example, both the partial structures may be bonded together by a procedure in which the dry photohardenable film is laminated on the protection film of one partial structure in the beginning, said dry photohardenable film is subsequently laminated on the protection film of the other partial structure so that a exposed surface of said dry photohardenable film is contacted with a surface of the latter protection film, and finally, an obtained lamination is pressed.

Figure 2G:
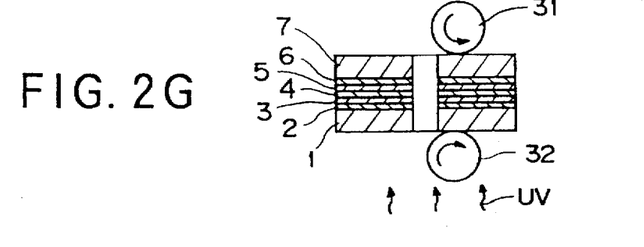
Figure 3A:
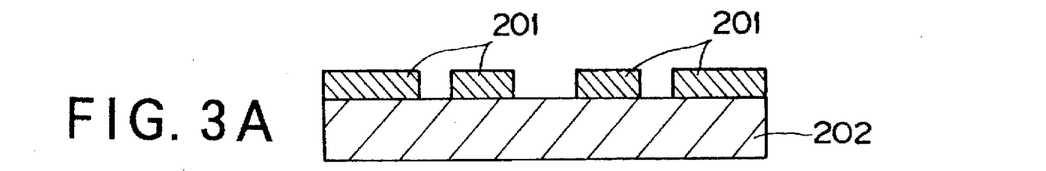
FIGS. 3A–3D is a process diagram showing one embodiment of the method of producing the first and the second substrate used in the present invention.
Figure 3B:
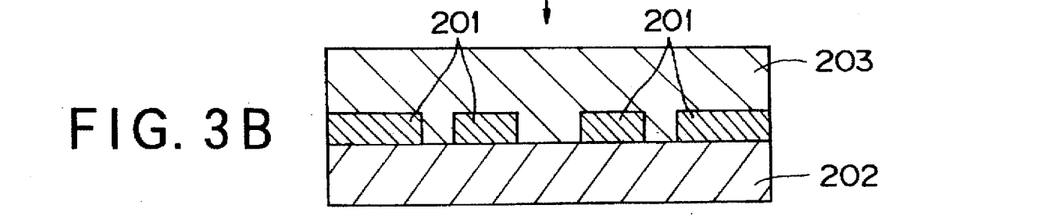
Figure 3C:
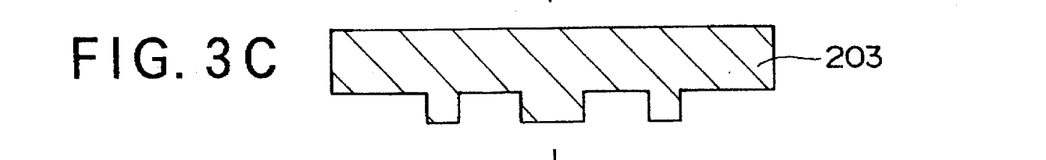
Figure 3D:
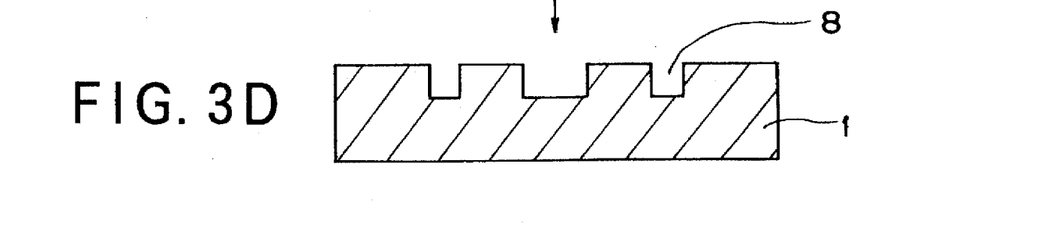

After the bonding procedure, as shown in FIG. 2G, the whole portion of the dry photohardenable film 4 in the non-hardened condition is hardened by irradiating the lamination having an optical disklike shape with the ultra-violet light (UV) under the pressing condition, thus the optical disk of the present invention is completed.

The reason why the film is hardened under the pressure is to strongly bond the first partial structure from the steps 2a–2b and the second partial structure from the steps 2c–2d together.

The applied pressure at the time of the ultra-violet light irradiation is normally about equal with that one when the dry photohardenable film is laminated and pressed between the two partial structures. In the lamination having disklike shape of the step 2G, the first optical film 2 and the first protection film 3 being at the first transparent substrate 1 side of the optical disk transmit at least a part of the incident light beam. Therefore, it is possible to harden the dry photohardenable film 4 which is in the non-hardened condition and exists in the lamination having disklike shape, by irradiating the lamination with the ultra-violet light from the first transparent substrate 1 side. The irradiation energy of the ultra-violet light required for this hardening operation, is normally 100 mJ/cm$^2$ or more, and preferably about 1,000 mJ/cm$^2$.

As described above, when the optical disk of the present invention is reproduced, the information signals respectively carried on a plurality of pit-groove surfaces laminated on each other can be simultaneously or continuously read while no reading obstruction is caused, by the beam for reproduction irradiating from one side of the optical disk. Therefore, it is possible to increase the recording density per a certain extent of the area on the optical disk, and to extend the reproducing time, without the enlargement of disk area or the reduction of pit size. The transmission rate can be also increased by using a plurality of the pickups.

Furthermore, in this optical disk, since it is sufficient for reproduction as long as the reproduction beams irradiate the optical disk from only one side thereof, if the second pit-groove surface are continuously reproduced after the reproduction of the first pit-groove surface is over, or if the reproduction is continuously performed in reverse order to the former, there is no necessity to turn over the optical disk by the hands or the mechanical operation in the reproducing device or to move the pickup to the opposite side of the optical disk by the mechanical operation in the reproducing device. Therefore, it is possible to get rid of trouble what the audience must turn over the optical disk, and to simplify a pickup-moving mechanism in the reproducing device.

On the other hand, in the aforementioned method, the viscosity of the dry photohardenable film at the room temperature and in the non-hardened condition is set at 3,500 to 400,000 poises, and the thickness of said film at the room temperature is set at 5 to 200 μm. Thus, the sufficient adhesion is secured at the step in which the first optical or protection film is bonded to the second optical or protection film. And also, the handling of the dry photohardenable film is easy during the optical disk is manufactured, because no wrinkle is generated during preserving said film. Furthermore, the stress due to the shrinkage by hardening at the time of the ultra-violet light irradiation is prevented from getting too much. Therefore, the optical disk of the present invention can be produced efficiently by means of this method.

What is claimed is:

1. An optical disk comprising:
    a first partial structure which comprises a first transparent substrate having a first pit-groove surface provided with first pits or grooves carrying first information signals, and a first optical film formed on the first pit-groove surface;
    a second partial structure which comprises a second substrate having a second pit-groove surface provided with second pits or grooves carrying second information signals, and a second optical film formed on the second pit-groove surface; and
    an intermediate layer interposed between the first and second partial structures, with the first optical film side of the first partial structure and the second optical film side of the second partial structure disposed opposite to each other, wherein, the first optical film partially transmits an incident light beam, each of the second pits or grooves has a shape capable of having the second information signal read by irradiating the optical disk with the incident light beam from a first transparent substrate side of the optical disk, and the intermediate layer is formed of a dry photohardenable film of light transmissive type consisting of a photo-polymerization type photo-sensitive resin compound, which has a viscosity of 3,500 to 400,000 poises at a room temperature and in a non-hardened condition and has a thickness of 5 to 200 µM in the non-hardened condition and said photo-polymerization type photo-sensitive resin compound comprises ethylene unsaturated monomer, photo-polymerization initiator, and binder-polymer.

2. An optical disk according to claim 1, wherein the first optical film is a reflection film or a record film.

3. An optical disk according to claim 2, wherein the first optical film is the reflection film, which is formed of a metallic film comprising at least one material selected from the group consisting of silver, nickel, and aluminum, and having a thickness of 100 to 200 Angstrom.

4. An optical disk according to claim 2, wherein the first optical film is the record film, which is formed of a dielectric material comprising at least one material selected from the group consisting of zinc selenide, bismuth oxide, cadmium sulfide, and cadmium telluride.

5. An optical disk according to claim 1, wherein the second optical film is a reflection film or a record film.

6. An optical disk according to claim 5, wherein the second optical film is the reflection film comprising at least one material selected from the group consisting of aluminum, aluminum alloy, gold, silver, and copper, and having a thickness of 0.05 to 0.2 µm.

7. An optical disk according to claim 1, wherein at least one of first partial structure and the second partial structure further comprises a protection film laminated on the optical film side of said partial structure.

8. An optical disk according to claim 7, wherein the protection film comprises at least one material selected from the group consisting of epoxy resin, acrylic resin, silicone resin, urethane resin, ethylene/vinyl acetate copolymer, and ultra-violet light hardenable resin, and has a thickness of 2 to 200 µm.

9. An optical disk according to claim 1, wherein the dry photohardenable film has the viscosity of 20,000 to 40,000 poises at the room temperature and in the non-hardened condition.

10. An optical disk according to claim 1, wherein the dry photohardenable film has the thickness of 20 to 80 µm in the non-hardened condition.

11. An optical disk according to claim 1, wherein the photo-polymerization type photo-sensitive resin compound comprises 5 to 90 weight % of the ethylene unsaturated monomer, 0.5 to 30 weight % of the photo-polymerization initiator, and 5 to 90 weight % of the binder-polymer.

12. An optical disk according to claim 1, wherein the dry photohardenable film after the hardening has a refraction index of 1.40 to 1.60.

13. An optical disk according to claim 12, wherein differences in the refraction index between the dry photohardenable film and the first transparent substrate, and between said film and the second substrate are 0.05 or less respectively.

14. An optical disk according to claim 1, wherein a depth of the first pits or grooves and second pits or grooves have 0.02 to 1 µm.

15. A method of producing an optical disk comprising:

a step of preparing a first partial structure by forming a first optical film, which partially transmits an incident light beam, on a first pit-groove surface of a first transparent substrate in which the first pit-groove surface is provided with first pits or grooves carrying first information signals;

a step of preparing a second partial structure by forming a second optical film on a second pit-groove surface of a second substrate, in which the second pit-groove surface is provided with second pits or grooves carrying second information signals and in which each of second pits or grooves is formed into a shape capable of being read by irradiating the second substrate with a light beam from a second pit-groove surface side on the second substrate;

a step of bonding the first and the second partial structures together by laminating a dry photohardenable film of light transmissive type, which has a viscosity of 3,500 to 400,000 poises at a room temperature and in a non-hardened condition and has a thickness of 5 to 200 µM in the non-hardened condition, between the first and the second partial structures with the first optical film side of the first partial structure and the second optical film side of the second partial structure disposed opposite to each other to form a layered product, and by pressing the layered product from one end toward the other end thereof while passing through and between an over roll and an under roll to apply a pressure with the over roll and the under roll of 0.5 to 50 kg/cm²; and a step of hardening the dry photohardenable film in the layered product by irradiating the layered product with ultra-violet light from a first transparent substrate side of the layered product, while pressing the layered product.

16. A method of producing an optical disk according to claim 15, wherein, in the step of preparing a first partial structure, a protection film is formed on the first optical film side of the first partial structure.

17. A method of producing an optical disk according to claim 16, wherein, the protection film comprises at least one material selected from the group consisting of epoxy resin, acrylic resin, silicone resin, urethane resin, ethylene/vinyl acetate copolymer, and ultra-violet light hardenable resin, and has a thickness of 2 to 200 µm.

18. A method of producing an optical disk according to claim 15, wherein, in the step of preparing a second partial structure, a protection film is formed on the second optical film side of the second partial structure.

19. A method of producing an optical disk according to claim 18, wherein, the protection film comprises at least one material selected from the group consisting of epoxy resin, acrylic resin, silicone resin, urethane resin, ethylene/vinyl acetate copolymer, and ultra-violet light hardenable resin, and has a thickness of 2 to 200 µm.

20. A method of producing an optical disk according to claim 15, wherein, in the step of bonding the first and the second partial structures together, the dry photohardenable film has the viscosity of 20,000 to 40,000 poises at the room temperature and in the non-hardened condition.

21. A method of producing an optical disk according to claim 15, wherein, in the step of bonding the first and the second partial structures together, the dry photohardenable film has the thickness of 20 to 80 µm in the non-hardened condition.

22. A method of producing an optical disk according to claim 15, wherein, in the step of bonding the first and the second partial structures together, the dry photohardenable film having a shape of a film or a sheet is continuously supplied from a film supplying roller to be laminated between the first and the second partial structures, and after pressing the layered product, unnecessary portions of the dry photohardenable film are removed.

23. A method of producing an optical disk according to claim 15, wherein, a transporting speed with the over roll and the under roll is 0.05 to 10 meters/minute.

24. A method of producing an optical disk according to claim 15, wherein, in the step of hardening the dry photohardenable film, the layered product is pressed under 0.5 to 50 kg/cm$^2$ with the over roll and the under roll.

25. A method of producing an optical disk according to claim 15, wherein, in the step of hardening the dry photohardenable film, an irradiation energy of the ultra-violet light is 100 mJ/cm$^2$ or more.

26. A method of producing an optical disk comprising:

a step of preparing a first partial structure by forming a first optical film, which partially transmits an incident light beam, on a first pit-groove surface of a first transparent substrate in which the first pit-groove surface is provided with first pits or grooves carrying first information signals;

a step of preparing a second partial structure by forming a second optical film on a second pit-groove surface of a second substrate, in which the second pit-groove surface is provided with second pits or grooves carrying second information signals and in which each of second pits or grooves is formed into a shape capable of being read by irradiating the second substrate with a light beam from a second pit-groove surface side on the second substrate;

a step of bonding the first and the second partial structures together by laminating a dry photohardenable film of light transmissive type, which has a viscosity of 3,500 to 400,000 poises at a room temperature and in a non-hardened condition and has a thickness of 5 to 200 µM in the non-hardened condition, between the first and the second partial structures with the first optical film side of the first partial structure and the second optical film side of the second partial structure disposed opposite to each other to form a layered product, and by pressing the layered product from one end toward the other end thereof while passing through and between an over roll and an under roll to transport said layered product with the over roll and the under roll at a speed of 0.05 to 10 meters/minute; and a step of hardening the dry photohardenable film in the layered product by irradiating the layered product with ultra-violet light from a first transparent substrate side of the layered product, while pressing the layered product.

27. An optical disk according to claim 7 wherein a protection film formed of an ultra-violet light hardenable resin is laminated between said first partial structure and said intermediate layer.

28. A method of producing an optical disk according to claim 16 wherein an ultra-violet light hardenable resin is coated on said first optical film of the first partial structure and then hardened to form a protection film.

* * * * *